(12) United States Patent
Cors et al.

(10) Patent No.: US 9,948,711 B2
(45) Date of Patent: Apr. 17, 2018

(54) ALLOCATING AND MANAGING CLOUD COMPUTING RESOURCES FOR DISASTER RECOVERY

(71) Applicant: International Business Machines Corporation, Armonk, NY (US)

(72) Inventors: Josep Cors, Rochester, MN (US); Naresh Nayar, Rochester, MN (US); Birgit M. Pfitzmann, Wettswil (CH); Suraj Subramanian, Lafeyette, LA (US); Gerhard A. Widmayer, Herrenberg (DE)

(73) Assignee: International Business Machines Corporation, Armonk, NY (US)

(*) Notice: Subject to any disclaimer, the term of this patent is extended or adjusted under 35 U.S.C. 154(b) by 259 days.

(21) Appl. No.: 14/738,966

(22) Filed: Jun. 15, 2015

(65) Prior Publication Data

US 2016/0366218 A1    Dec. 15, 2016

(51) Int. Cl.
*G06F 15/173* (2006.01)
*H04L 29/08* (2006.01)
(Continued)

(52) U.S. Cl.
CPC ............ *H04L 67/1095* (2013.01); *G06F 9/46* (2013.01); *H04L 67/10* (2013.01);
(Continued)

(58) Field of Classification Search
CPC ....... G06F 9/46; H04L 43/0817; H04L 67/10; H04L 67/1034; H04L 67/1095; H04L 69/40
See application file for complete search history.

(56) References Cited

U.S. PATENT DOCUMENTS 8,122,289 B2    2/2012 Sargor et al.
2004/0153708 A1*   8/2004 Joshi ............... G06F 9/5088
                                                          714/47.2
(Continued)

FOREIGN PATENT DOCUMENTS

EP    1863222 A1    12/2007
EP    1981221 A1    10/2008
WO    2004061665 A2    7/2004

OTHER PUBLICATIONS

IBM, "Managed Cloud—IBM Cloud Managed Services", © 2015 IBM Corporation, pp. 1-3, <http://www.ibm.com/cloud-computing/us/en/products/ibm-cloud-managed-services.html> or <http://www.ibm.com/marketplace/cloud/managed-cloud/us/en-us>.

*Primary Examiner* — Christopher Biagini
(74) *Attorney, Agent, or Firm* — James H. Mayfield; Nicholas L. Cadmus

(57) ABSTRACT

A method, executed by a computer, for allocating resources includes assigning resiliency attributes to a server having a workload, linking each server to a partner resource, duplicating the workload of each server in an offsite location accessible to the partner resource, detecting a disaster event, and transferring the workload of the server automatically to the partner resource. In some embodiments, the partner resource is a plurality of pool servers. The partner resource may be calculated by performing a capacity analysis. The partner resource may not be specifically assigned resource until a disaster occurs. In some embodiments, the workload is duplicated such that the recovery point objective of the workload is minimized. A computer program product and computer system corresponding to the methods are also disclosed herein.

14 Claims, 7 Drawing Sheets

(51) Int. Cl.
  *G06F 9/46* (2006.01)
  *H04L 29/14* (2006.01)
  *H04L 12/26* (2006.01)

(52) U.S. Cl.
  CPC .......... *H04L 67/1034* (2013.01); *H04L 69/40* (2013.01); *H04L 43/0817* (2013.01)

(56) References Cited

U.S. PATENT DOCUMENTS

| | | |
|---|---|---|
| 2005/0193245 A1 | 9/2005 | Hayden et al. |
| 2005/0273650 A1* | 12/2005 | Tsou .................. G06F 11/1456 714/6.12 |
| 2007/0234115 A1* | 10/2007 | Saika .................. G06F 11/2028 714/13 |
| 2012/0136833 A1* | 5/2012 | Bartholomy ........ G06F 11/2028 707/644 |
| 2013/0263122 A1* | 10/2013 | Levijarvi ............ G06F 11/1415 718/1 |
| 2015/0039930 A1 | 2/2015 | Babashetty et al. |
| 2015/0067682 A1 | 3/2015 | Calder et al. |
| 2016/0342618 A1* | 11/2016 | Watkins ............ G06F 17/30174 |

\* cited by examiner

| Resiliency Attributes | Resiliency Groups | | | | | |
|---|---|---|---|---|---|---|
| | No DR | Restore Low | Restore High | Restore High | Reserve Low | Reserve High |
| DRPlacementPriority | 0 | 10 | 20 | 20 | 30 | 40 |
| StorageDrMirror | No | No | No | No | Yes | Yes |
| Backup | No | Yes | Yes | Yes | Yes | Yes |
| StorageHa | No | No | No | No | Yes | Yes |
| AppConsistencyGroup | NULL | NULL | NULL | NULL | AcgName | AcgName |
| PreEmptRelatedHost | NULL | NULL | VmUUID | VmUUID | VmUUID | NULL |
| SLA (Bronze, Silver, Gold) | | | | | | |

FIG. 2

ALLOCATING AND MANAGING CLOUD COMPUTING RESOURCES FOR DISASTER RECOVERY

BACKGROUND OF THE INVENTION

The present invention relates generally to high availability and disaster recovery, and more specifically, to recovering servers during a disaster event or for workloads to continue operating in the event that one or more of the assigned resiliency attributes fails.

A high availability even occurs when an application resiliency attribute fails. A disaster event occurs when a site experiences an extensive failure, such as a failure that might be caused by a prolonged power outage, a natural disaster, or the purposeful destruction of the site by saboteurs. Disaster recovery utilizes backed-up data and industry tools to manage the data at the recovery site in order to reinstate the down servers. For sites having many servers, disaster recovery is facilitated by grouping the servers into categories based on their shared characteristics. One challenge is designing and specifying the attributes of the disaster recovery infrastructure in a manner that is independent.

SUMMARY

As disclosed herein, a method, executed by a computer, for allocating resources includes assigning resiliency attributes to a server having a workload, linking each server to a partner resource, duplicating the workload of each server in an offsite location accessible to the partner resource, detecting a disaster event, and transferring the workload of the server automatically to the partner resource. In some embodiments, the partner resource is a plurality of pool servers. The partner resource may be calculated by performing a capacity analysis. The partner resource may not a specifically assigned resource until a disaster occurs. In some embodiments, the workload is duplicated such that the recovery point objective of the workload is minimized. A computer program product and computer system corresponding to the methods are also disclosed herein.

BRIEF DESCRIPTION OF THE DRAWINGS

FIG. 2 is a chart of one embodiment of a translation table in accordance with the present invention;

DETAILED DESCRIPTION

Embodiments of the present invention relate generally to disaster recovery and high availability, and more specifically, to allocating resources for disaster recovery and high availability. Typically, disaster recovery is addressed in an automatic fashion by a disaster recovery orchestrator. The disaster recovery orchestrator is a tool that enables the automation and management of disaster recovery. The target of recovery may be a server, database, virtual machine, application, or the like. In certain embodiments, disaster recovery is made manageable by classifying servers using a set of resiliency attributes, which may control the various tools, techniques, and solutions that are available to a disaster recovery orchestrator during the disaster recovery process.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter.

Figure 1:
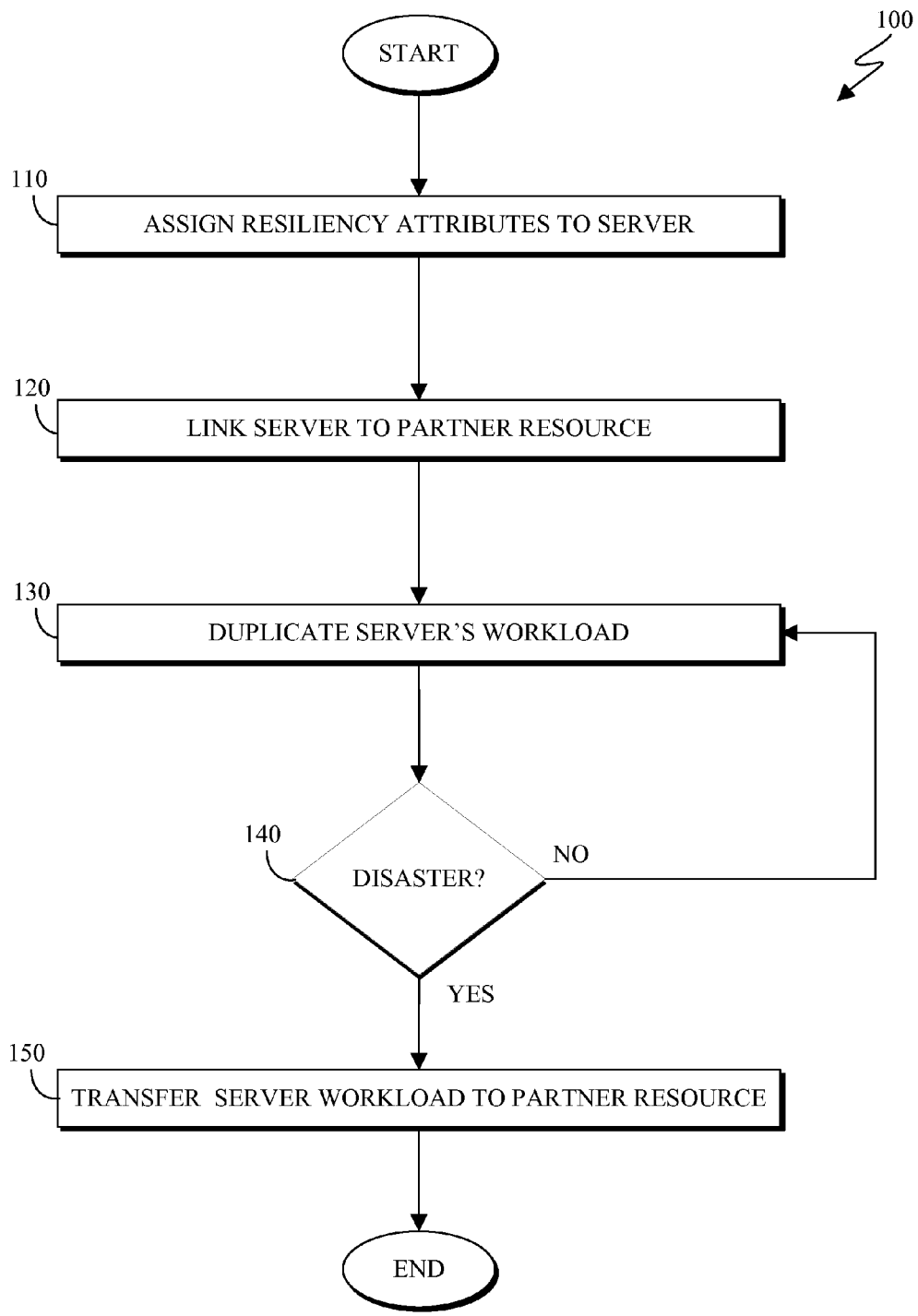
FIG. 1 is a flowchart of one embodiment of a method for allocating resources in accordance with the present invention.

FIG. 1 is a flowchart of one embodiment of a resource allocation method 100 in accordance with the present invention. As depicted, the resource allocation method 100 includes assigning (110) resiliency attributes to a server, linking (120) a server to its partner resource, duplicating (130) the server's workload, determining (140) whether there is a disaster, and transferring (150) the server's workload to its partner resource. The resource allocation method 100 may enable multiple servers at a disaster site to be fully recovered at one or more recovery sites.

Assigning (110) resiliency attributes to a server may include selecting a particular set of characteristics for each server. In some embodiments, a user can set the resiliency attributes to configure which type(s) of remote backup will used by servers that are assigned to a particular set of resiliency attributes. A translation table may provide a user interface through which users may access the resiliency attributes. In some embodiments, a server is given certain resiliency attributes because of its workload or work capacity. A server may thus be given a higher or lower priority (e.g. servers belonging to that group will be among the first to be restored) if the server is running mission-critical software.

Linking (120) a server to a partner resource may include determining the workload of the server, finding a partner resource that is appropriate, and connecting the two. In some embodiments, the workload of a server is subsumed or preempted by the partner resource, which is also capable of handling the workload. A server's workload may be a measure of the server's system requirements necessary to perform its assigned tasks. A partner resource may be a server capable of handling the server's workload, yet situated offsite from the server (i.e. not at the disaster site) and thus not directly affected by a disaster. In some embodiments, the partner resource is a group of servers working in tandem to take up the server's workload. The process of determining whether a partner resource is appropriate for the server may be known as "capacity analysis." Capacity analysis may also include analyzing the compute capacity of servers and deciding whether or not to shut down any of the lesser priority servers in the pool, or use a number of the less priority servers to accommodate the workload of the higher priority servers. In some embodiments, if the capacity is fully utilized, new servers are ordered and provided to the disaster recovery site.

Duplicating (130) the server's workload may include making a copy of the server's memory and/or disk storage. This may include any data, virtual machines running on the server, or the like that are associated with the server. In some embodiments, the duplicated workload is placed in a location accessible by the server and/or the server's partner resource. The location of the duplication may be offsite from the perspective of the server's location. Backing up (130) a server may refer to creating a backup copy in a traditional manner, or backing up with methods such as IBM's Global Mirror, which provides data replication over extended distances between two sites for business continuity and disaster recovery. It should be understood that "duplication" does not necessarily refer to a copy or backup of the data, but may also include multiple copies, backups, or any other forms of workload redundancy schemes.

Determining (140) whether there is a disaster event (or a high availability event) may include detecting an event that disrupts the function of all or a portion of the disaster site's servers or causes the resiliency attributes to fail. In certain embodiments, a disaster event is defined as an event that impairs the disaster site's servers so severely that any unaffected servers at the disaster site cannot provide adequate functionality to fully assume the workload of the non-functioning servers. If there is not a disaster event, then the resource allocation method 100 may continue looping at the server workload duplication operation 130.

Transferring (150) a server's workload to its partner resource server occurs when a disaster/high availability event is detected, and may include transferring the server's workload to its partner resource at the disaster recovery site. In some embodiments, transferring (150) a server's workload involves a partner resource accessing a backup of the server and assuming the server's workload. The partner resource may continue to cover the server's workload until such time as the disaster site is rendered operational once again.

FIG. 2 is chart of one embodiment of a translation table 200 in accordance with the present invention. As depicted, the translation table 200 includes columns of resiliency groups 210 and rows of resiliency attributes 220. At each intersection of a column and row is the setting for a particular resiliency attribute 220 for a given group 210, which may enable a fine degree of control over the properties of each resiliency group 210.

A resiliency group 210 may simply be defined as a group of resiliency attributes common to servers. Each resiliency group 210 may include various servers that have in common a set of disaster recovery settings known as resiliency attributes 220. In some embodiments, when a server is assigned to a resiliency group 210, the disaster recovery options inherent to that disaster recover group 210 are applied to the server. For example, resiliency groups 210 may include the null group of no disaster recovery, restore low, restore high, reserve low, and reserve high. It should be noted that these resiliency groups 210 are merely exemplary, as there may be limitless types and combinations of resiliency attributes 220. If a server is assigned to the null group, then the server may not receive any of the characteristics associated with resiliency group 210 membership.

The two restore groups, restore low and restore high, may describe resiliency groups 210 in which the functionality of servers is restored via partner resources which obtain the servers' workload data using globally mirrored data. The reserve groups, on the other hand, may use partner resources that are left at least partially idle and set aside specifically in the event of a disaster. The low and high aspects to the names of the resiliency groups 210 may describe the priority of the group; i.e., servers belonging to restore low have a lower priority than restore high, and servers belonging to reserve low have a lower priority than reserve high.

Resiliency attributes 220 may include settings that together characterize a resiliency group 210. Resiliency attributes 220 may include DRPlacementPriority, StorageDRMirror, Backup, StorageHa, AppConsistencyGroup, PreEmptRelatedHost, and SLA. These resiliency attributes 220 (and even the names of the attributes) are merely exemplary and do not represent all possible resiliency attributes 220. These resiliency attributes 220 may enable a fine degree of control over the properties of each resiliency group.

In some embodiments, DRPlacementPriority represents the overall priority of the resiliency group 210. Priority may refer to the order in which each group of servers is recovered. As depicted, for example, Reserve High has a priority of 40, which is higher than the other DRPlacementPriority values of 0, 10, 20, and 30, meaning that servers assigned to Reserve High are given the highest overall priority. In this example, servers that perform the most mission-critical functions may be assigned to Reserve High in order to ensure that, in the event of a disaster, these mission-critical servers are restored first.

The StorageDrMirror attribute may be used to determine whether or not a server uses a globally mirrored storage such as Global Mirror, a two-site unlimited distance data replication solution for both System z and Open Systems data. Similarly, the Backup attribute may determine whether other types of backup technologies are employed on servers with this attribute.

In some embodiments, StorageHa determines whether or not the storage high availability backup feature is enabled. Storage high availability backup may ensure that data is written in duplicate by not confirming a write-to-disk until as complete until the data is written to two logical storage units referred to as LUNs. Thus, StorageHa creates a backup of data that has little or no Recovery Point Objective (RPO), which measures the safety of backup data by referring to the amount of time that has elapsed since the last data protection event (i.e. when the most recent backup occurred).

The AppConsistencyGroup attribute may be used to apply a StorageHa-style low RPO backup scheme onto a server using Global Mirror. Whereas StorageHa may reduce the RPO by mirroring data across local LUNs, Consistency Groups may apply the same concept to minoring data across LUNs that are not local to each other (i.e. at least one LUN is located at the disaster site).

PreEmptRelatedHost may refer to whether or not the partner resource will preempt the server's workload. In some embodiments, the partner resource may be running its own workload at the time of the disaster event. The partner resource may preempt the server's workload by abandoning its own workload in favor of adopting the server's workload. In some embodiments, the partner resource's workload may be backed up before the partner resource preempts the server's workload.

SLA refers to the service level agreement, an attribute that may be used to automatically enable or disable other attributes. Depending on the customer's choice of service level agreement, costlier features may be enabled or disabled that modify the resilience of the customer's server(s). For example, a gold service level agreement may provide for more redundancy of data, whereas a bronze level may only provide for rudimentary disaster recovery options.

This list of resiliency attributes is not exhaustive and may include many other resiliency attributes. In some embodiments, other resiliency attributes include attributes such as local minoring, a synchronous minoring technique across building blocks for high availability and global mirroring, an asynchronous technique employed across sites. Other resiliency attributes may include backing up in multiple building blocks for high availability and backing up across sites for disaster recovery.

Figure 3:
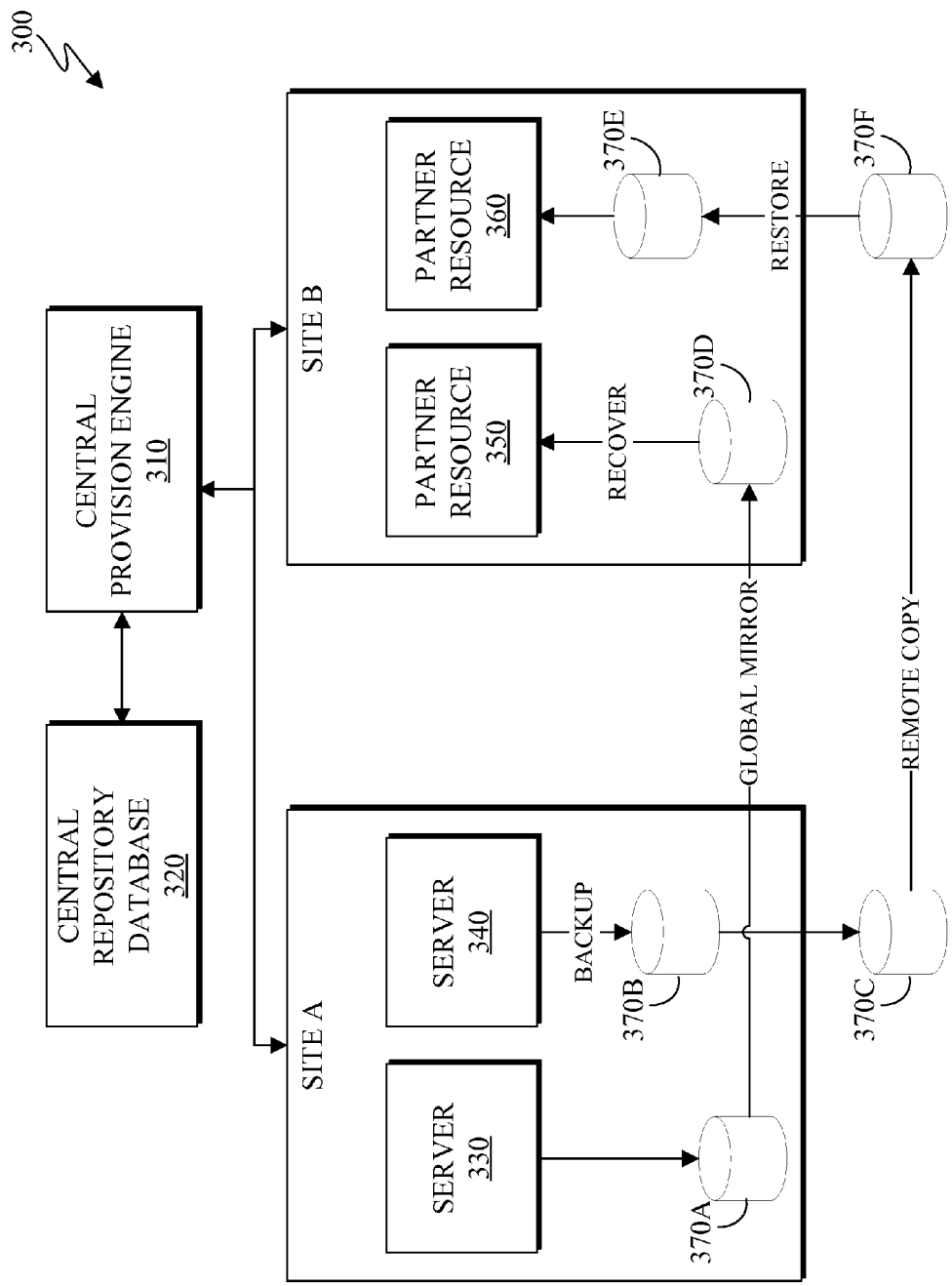
FIG. 3 is a block diagram of one embodiment of an infrastructure model for allocating resources in accordance with the present invention.

FIG. 3 is a block diagram of one embodiment of an infrastructure model 300 for disaster recovery in accordance with the present invention. As depicted, the infrastructure model 300 includes a central provision engine 310, a central repository database 320, two servers 330 and 340 at site A (the site of the disaster), two partner resources 350 and 360 at site B (the disaster recovery site), and several backups of data 370A-F. The infrastructure model 300 may illustrate the difference between disaster recovery paradigms that use global mirror versus remote copies.

In some embodiments, the central provision engine 310 matches a server to its partner resource. The central provision engine 310 may need to take into account certain considerations before matching a server with a partner resource, such as the server's workload and the partner resource's system specifications. Thus, the central provision engine 310 may perform what is known as a capacity analysis. In some embodiments, the central provision engine 310 is provided with a pre-defined algorithm for matching servers with partner resources and determining whether such a pairing is appropriate. For example, a central provision engine 310 may not match a server with a partner resource whose system requirements would be exceeded by the server's workload if the server's workload requires eight processors and the partner resource only has six processors. Similar considerations relating to storage, memory, or other resources may also affect the pairing of servers with partner resources.

Furthermore, the central provision engine may not partner resource each server to partner resource in such a fashion that there is a 1:1 ratio between the server and a recovery server, but rather, the partner resource may represent a pool of servers such that the server's workload may be transferred to one or more recovery servers in the pool. In some embodiments, each pool server that is eligible to be a partner resource is assigned a pool server priority. The pool server priority may determine the order in which the pool servers are selected to act as a partner resource in the event of a disaster. For example, if a server's partner resource is actually a pool of three servers, the pool server having the highest priority will assume the server's workload during disaster recovery.

The central repository database 320 may include a listing of all of the servers that have partner resources. In some embodiments, the central repository database 320 stores each server-partner resource relationship by associating the IP addresses, MAC addresses, network names, or other identifiers of the server and partner resource. When either the server or partner resource in a paired relationship are modified or deleted, the central provision engine 310 polices and manages the changes, and updates the central repository database 320 accordingly.

The servers 330 and 340 may include servers that are rendered non-functional when a disaster event occurs at site A. The partner resources 350 and 360 may include computer systems that are paired with the servers in order to assume the servers' workloads. The partner resources 350 and 360 are located at site B, which is geographically separated from site A and thus isolated from the effects of the disaster event. In the depicted example, server 330 is partnered with partner resource 350, and server 340 is partnered with partner resource 360. In some examples, the partner resources 350 and 360 are not a discrete computer system, but rather a pool of partner resources that may be drawn upon in time of need; for example, partner resource 350 may represent several systems, any one of which is ready to preempt server 330's workload in the case of a disaster. In some embodiments, partner resource 350 and partner resource 360 may be at separate locations that are both offsite with respect to site A.

Partner resource 350 may receive server 330's workload via globally mirrored data. In some embodiments, server 330 backs its data up to backup 370A, which is globally mirrored to backup 370 D. When a disaster event occurs, server 330's workload is recovered onto partner resource 350 via backup 370D.

Partner resource 360 may receive server 340's workload by means of a remote copy of the data. Server 340 makes a local backup 370B at site A, which is transferred offsite to 370C before it may pass through 370F and after one or more hops, to back 370E, which is local to site B. Server 330 may then have its workload restored onto Partner resource 360. In another embodiment, the server 340 may backup immediately to remote copy 370C, through which the workload may be directly or indirectly transferred to partner resource 360.

Figure 4:
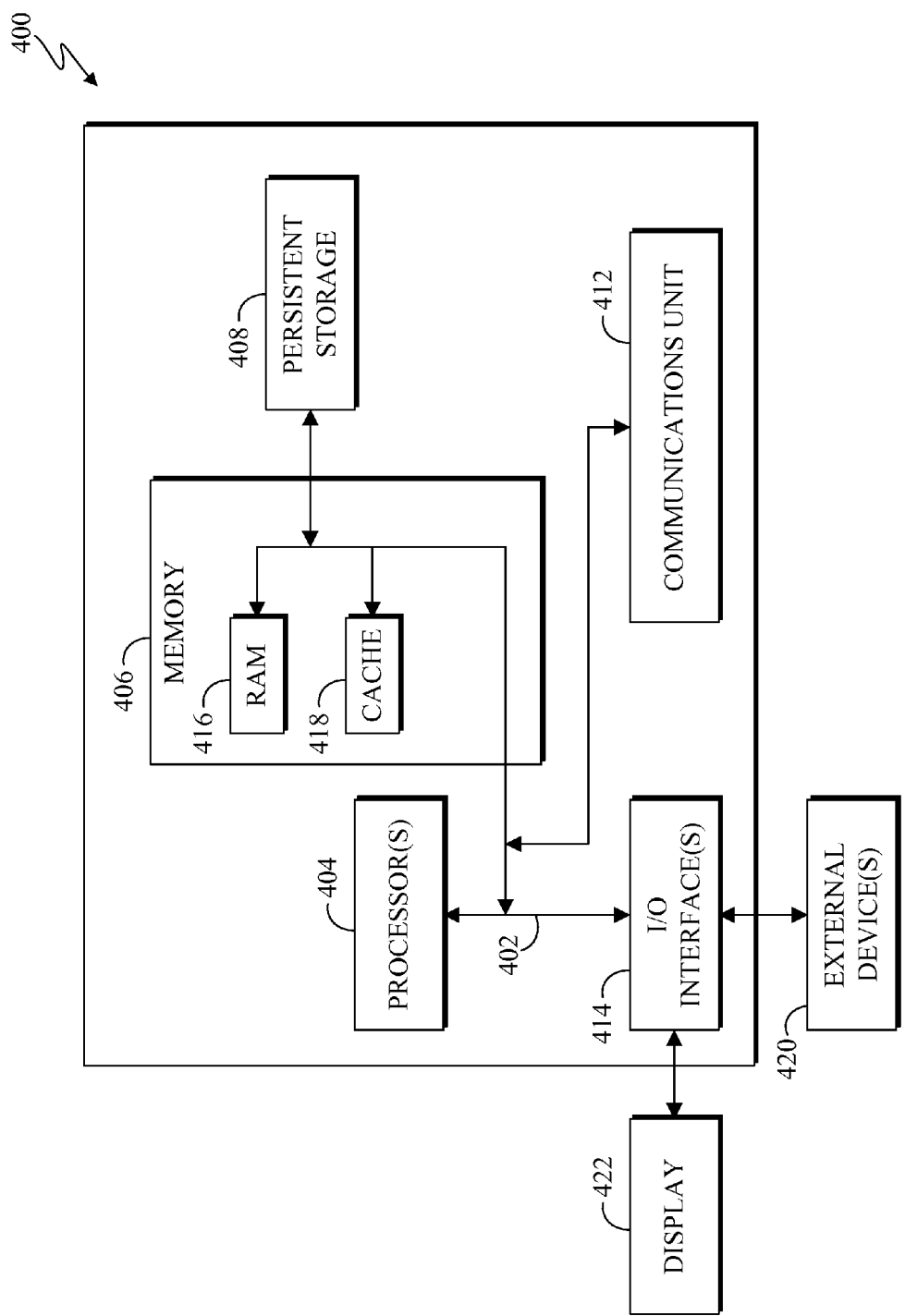
FIG. 4 is a block diagram depicting one example of a computing apparatus (i.e., computer) suitable for executing the methods disclosed herein.

FIG. 4 is a block diagram depicting components of a computer 400 suitable for executing the methods disclosed herein. The computer 400 may be one embodiment of the systems in the infrastructure model 300 depicted in FIG. 3. It should be appreciated that FIG. 4 provides only an illustration of one embodiment and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In the depicted embodiment, memory 406 includes random access memory (RAM) 416 and cache memory 418. In general, memory 406 can include any suitable volatile or non-volatile computer readable storage media.

One or more programs may be stored in persistent storage 408 for execution by one or more of the respective computer processors 404 via one or more memories of memory 406. The persistent storage 408 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 408 via I/O interface(s) 414. I/O interface(s) 414 may also connect to a display 422. Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
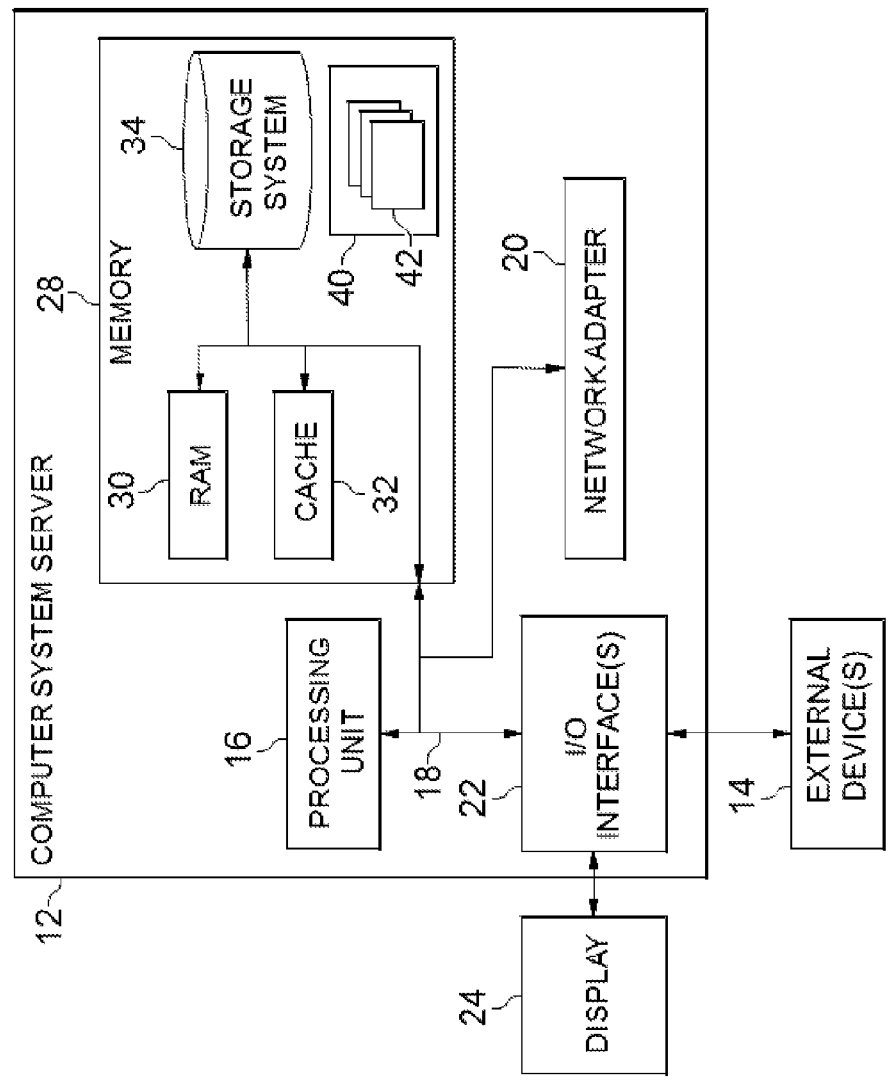
FIG. 5 depicts a cloud computing node according to an embodiment of the present invention.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
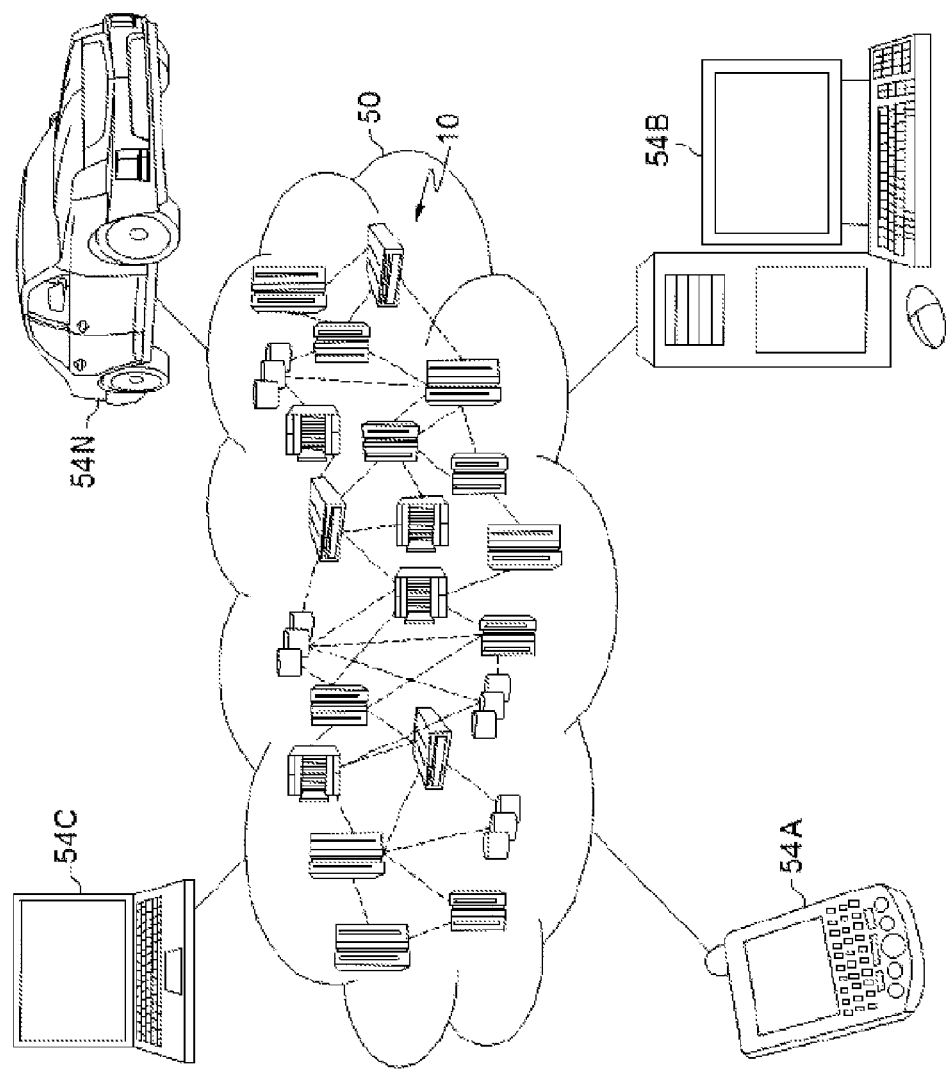
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
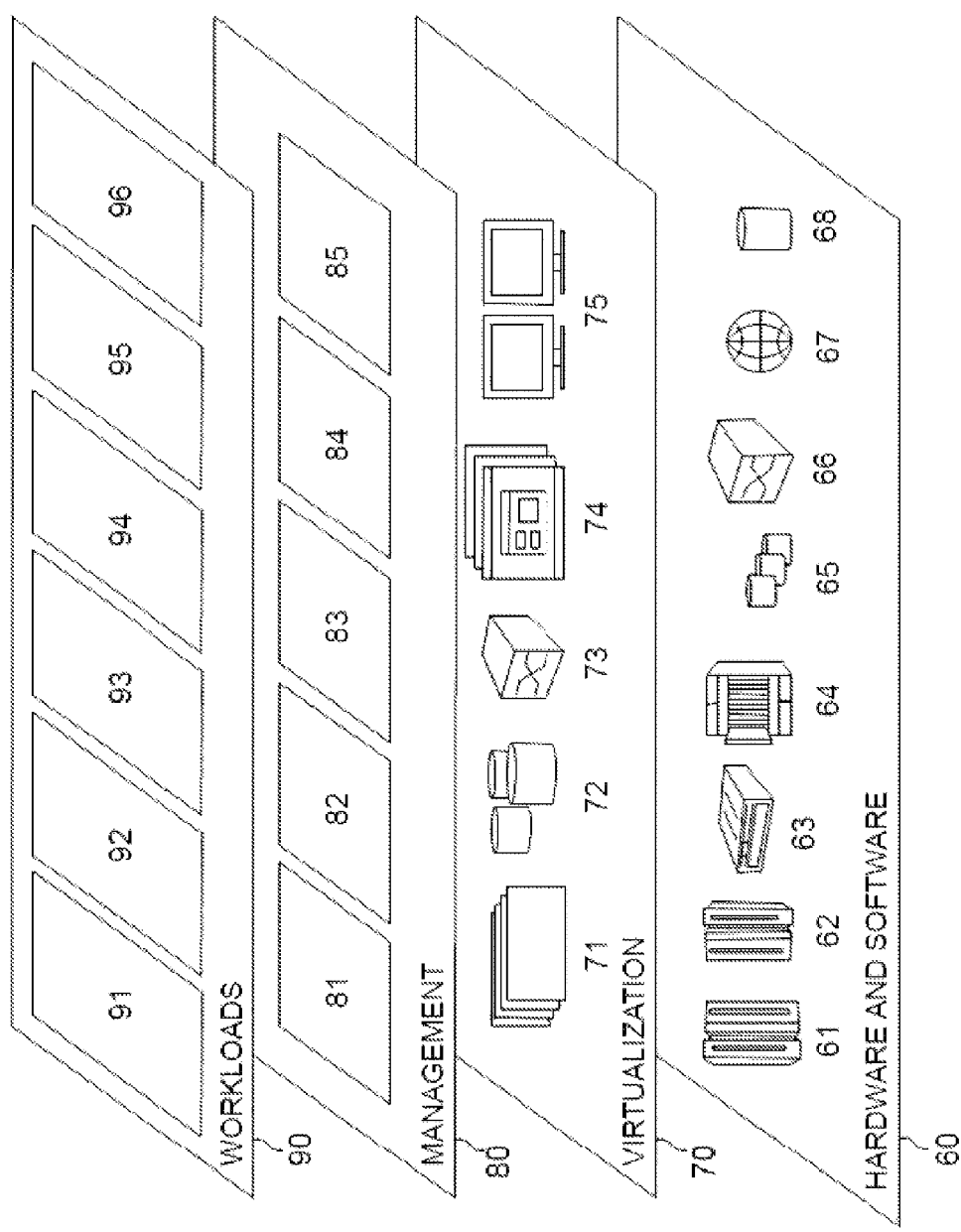
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual grouproom education delivery 93; data analytics processing 94; transaction processing 95; and deployed enterprise application 96.

What is claimed is:

1. A method of allocating resources, the method comprising:
    assigning a plurality of resiliency attributes to each server of a plurality of servers at a server site, wherein each server has a server workload, and wherein the plurality of resiliency attributes include one or more of a mirroring attribute, a backup attribute, a storage availability attribute, a consistency group attribute, and a service level agreement attribute;
    linking each server to at least one partner resource of a plurality of partner resources using a central provisioning engine, wherein the plurality of partner resources include at least one idle partner resource that has no workload and at least one preempt partner resource that has a preempt partner resource workload, and wherein the central provisioning engine determines whether each server is partnered with an idle partner resource or a preempt partner resource according to the server's resiliency attributes and the server's server workload;
    determining that there is a disaster at the server site; and
    responsive to determining that there is a disaster at the server site, transferring the server workload of each server on its corresponding partner resource, wherein transferring the server workload of a server whose partner resource is an idle partner resource comprises the idle partner resource assuming the server workload, and wherein transferring the server workload of a server whose partner resource is a preempt partner resource comprises the preempt partner resource abandoning its preempt partner resource workload in favor of the server workload.

2. The method of claim 1, wherein the partner resource comprises a plurality of pool servers.

3. The method of claim 1, wherein the partner resource is calculated by performing a capacity analysis using a central provisioning engine.

4. The method of claim 1, wherein the partner resource is not a specifically assigned resource until a disaster occurs.

5. The method of claim 1, wherein duplicating the server workload further comprises reducing a recovery point objective of the server workload by not confirming a write-to-disk as complete until the write-to-disk is written to at least two logical storage units, wherein the at least two logical storage units are not local to each other.

6. A computer program product for allocating resources, the computer program product comprising:
    a computer readable storage medium and program instructions stored on the computer readable storage medium, the program instructions comprising instructions to:
    assign a plurality of resiliency attributes to each server of a plurality of servers at a server site, wherein each server has a server workload, and wherein the plurality of resiliency attributes include one or more of a mirroring attribute, a backup attribute, a storage availability attribute, a consistency group attribute, and a service level agreement attribute;
    link each server to at least one partner resource of a plurality of partner resources using a central provisioning engine, wherein the plurality of partner resources include at least one idle partner resource that has no workload and at least one preempt partner resource that has a preempt partner resource workload, and wherein the central provisioning engine determines whether each server is partnered with an idle partner resource or a preempt partner resource according to the server's resiliency attributes and the server's server workload;
    determine that there is a disaster at the server site; and
    responsive to determining that there is a disaster at the server site, transfer the server workload of each server on its corresponding partner resource, wherein transferring the server workload of a server whose partner resource is an idle partner resource comprises the idle partner resource assuming the server workload, and wherein transferring the server workload of a server whose partner resource is a preempt partner resource comprises the preempt partner resource abandoning its preempt partner resource workload in favor of the server workload.

7. The computer program product of claim 6, wherein the partner resource comprises a plurality of pool servers.

8. The computer program product of claim 6, wherein the partner resource is calculated by performing a capacity analysis using a central provisioning engine.

9. The computer program product of claim 6, wherein the partner resource is not a specifically assigned resource until a disaster occurs.

10. The computer program product of claim 6, wherein the instructions to duplicate the server workload further comprise instructions to reduce a recovery point objective of the server workload by not confirming a write-to-disk as complete until the write-to-disk is written to at least two logical storage units, wherein the at least two logical storage units are not local to each other.

11. A computer system for allocating resources, the computer system comprising:
one or more computer processors;
one or more computer readable storage media; program instructions stored therein for execution by at least one of the one or more computer processors, the program instructions comprising instructions to:
assign a plurality of resiliency attributes to each server of a plurality of servers at a server site, wherein each server has a server workload, and wherein the plurality of resiliency attributes include one or more of a mirroring attribute, a backup attribute, a storage availability attribute, a consistency group attribute, and a service level agreement attribute;
link each server to at least one partner resource of a plurality of partner resources using a central provisioning engine, wherein the plurality of partner resources include at least one idle partner resource that has no workload and at least one preempt partner resource that has a preempt partner resource workload, and wherein the central provisioning engine determines whether each server is partnered with an idle partner resource or a preempt partner resource according to the server's resiliency attributes and the server's server workload;
determine that there is a disaster at the server site; and
responsive to determining that there is a disaster at the server site, transfer the server workload of each server on its corresponding partner resource, wherein transferring the server workload of a server whose partner resource is an idle partner resource comprises the idle partner resource assuming the server workload, and wherein transferring the server workload of a server whose partner resource is a preempt partner resource comprises the preempt partner resource abandoning its preempt partner resource workload in favor of the server workload.

12. The computer system of claim 11, wherein the partner resource is calculated by performing a capacity analysis using a central provisioning engine.

13. The computer system of claim 11, wherein the partner resource is not a specifically assigned resource until a disaster occurs.

14. The computer system of claim 11, wherein the instructions to duplicate the server workload further comprise instructions to reduce a recovery point objective of the server workload by not confirming a write-to-disk as complete until the write-to-disk is written to at least two logical storage units.

* * * * *